United States Patent [19]

Briner

[11] Patent Number: 4,865,251
[45] Date of Patent: Sep. 12, 1989

[54] RECEIVING STATION FOR LONG-DISTANCE HEATING

[75] Inventor: Theodor Briner, Uzwil, Switzerland
[73] Assignee: Steinemann AG, Flawil, Switzerland
[21] Appl. No.: 188,268
[22] Filed: Apr. 29, 1988
[30] Foreign Application Priority Data
  May 12, 1987 [CH] Switzerland .......................... 1809/87
[51] Int. Cl.⁴ .............................................. F24D 3/00
[52] U.S. Cl. ..................................... 237/8 R; 237/13
[58] Field of Search ............. 236/20 R, 9 A; 237/8 R, 237/13, 56

[56] References Cited
FOREIGN PATENT DOCUMENTS
  2342469  9/1977  France .................................. 237/13

Primary Examiner—Henry A. Bennet
Attorney, Agent, or Firm—Herbert Dubno

[57] ABSTRACT

The receiving station for long-distance heating has a heat exchanger for the transmission of heat from the long-distance heating medium, in particular water, to the heating water in a receiver circuit. This arrangement has a first automatic control system, controlled by thermometer probes in the receiver circuit, for regulating the temperature in said receiver circuit via a flow-control valve in the long-distance heating circuit, as well as a second differential-controlled automatic control system for regulating the passage in said receiver circuit via a variable-speed circulating pump. This allows an optimal utilization of the quantity of energy available and the lowest consumption of circulating long-distance heating water, which has to be paid for.

5 Claims, 1 Drawing Sheet

RECEIVING STATION FOR LONG-DISTANCE HEATING

FIELD OF THE INVENTION

The present invention relates to a receiving station for long-distance heating for the heating of heating water in a receiver circuit, with a heat exchanger for the delivery of heat from the long-distance heating medium, in particular, water, to the local heating water.

BACKGROUND OF THE INVENTION

Arrangements of the prior art have become known through the applicant that permit utilization of the long-distance heat up to about 60 KW capacity, which is sufficient to warranty a clean and energy-saving house heating and boiler heating for apartments and small houses. Equally, heat for chemical processes etc. may also be thus attained.

In order to attain capacities beyond this, in the region of 800 KW and more, for example, which permit the heating of apartment houses, schools, churches, office blocks and such like buildings as well as the heating of boilers therein, new conceptions of such arrangements are necessary which optimally utilize the energy available and hold the quantity of circulating long-distance heating water, which has to be paid for, low.

OBJECT OF THE INVENTION

Therefore, it is the object of the present invention to provide a receiving station for long-distance heating which optimally utilizes the energy available and hold the quantity of circulating long-distance heating water, which has to be paid for, low.

SUMMARY OF THE INVENTION

This is achieved in accordance the invention by a first automatic control system, controlled by thermometer probes in the receiver circuit via a flow-control valve in the long-distance heating circuit, as well as a second differential-controlled automatic control system for regulating the passage in said receiver circuit via a variable-speed circulating pump.

Thus it is possible to exclude the undefined parameter which hitherto caused an excess consumption of long-distance heating water between the receiver circuit and the receiver return pipe effected by the long-distance-heating-water circuit, because the two control circuits of the invention automatically bring about a self-maintained mean operating condition for the optimal utilization of the quantity of energy available.

BRIEF DESCRIPTION OF THE DRAWING

Further features and advantages of the invention will be apparent from the embodiments described by way of example and with reference to the accompanying drawing, in which.

DETAILED DESCRIPTION OF THE PREFERRED EMBODIMENTS

The receiving station for long-distance heating serves the heating of heating water for a receiver circuit 1, which is here indicated only by a receiver flow line 11 and a receiver return pipe 12. Between said receiver flow line and return pipe are the house-heating and boiler-heating circuits in parallel in the customary manner, not shown here in detail.

The heat exchange of long-distance heating water or other medium, circulation thereof being indicated by a flow line 3 and a return pipe 4, takes place on the heating water in the customary way by means of a heat exchanger 2, for example, in the form of a twin-pipe heat exchanger or the like.

Figure 1:
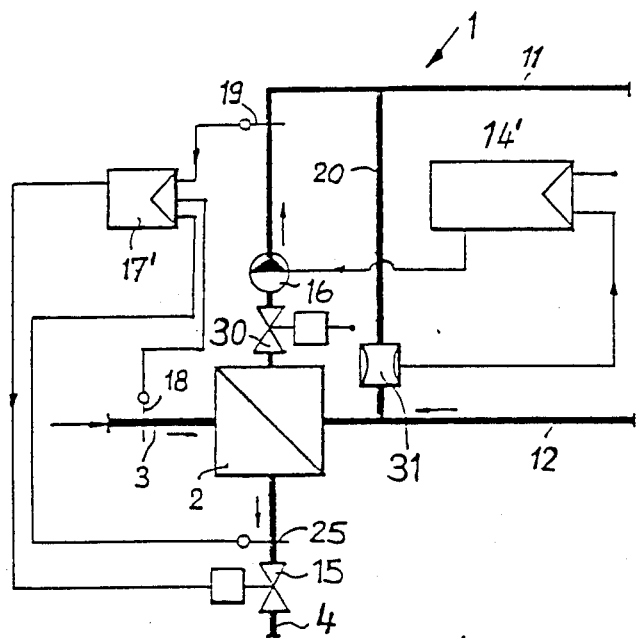
FIG. 1 is a diagrammatic representation showing the function of a first embodiment of the receiving station for long-distance heating.

An initial, relatively simple yet effective arrangement of the receiving station for a long-distance heating comprises according to FIG. 1 a first automatic control system 17', controlled by thermometer probes 19 in the receiver circuit 1, regulating the temperature in the receiver circuit 1 via a flow-control valve 15 in the long-distance heating circuit 3,4. Preferably control system 17' is a temperature-differential automatic control system which, in responding to a respective reference signal, and is operatively connected with further thermometer probes 18 and 25 in said long-distance heating flow line 3 and of the long-distance heating return pipe 4 respectively.

Furthermore, in accordance with the invention, a second differential-controlled automatic control system 14' is provided serving the regulation of the passage in the receiver circuit 1 and controlling a variable-speed circulating pump 16 disposed in the receiver-side. This automatic control system is the differential controlled automatic control system with a set point in form of a zero out-put. This differential-controlled control system 14' is electrically connected to a flow-control bypass 31 in a parallel pipe 20.

As a result of these steps, the consumption of long-distance heat is regulated exactly, within the extreme conditions—namely a switched-off arrangement (heating water cold) or zero output of heating water (heating water warm)—an oscillating optimal operating condition at a specified heating-water temperature range comes into operation.

In the arrangement according to FIG. 2, a cylindrical tank 5 containing a heating-water column 6 is subsequently added to said heat exchanger 2. Said tank 5 functions as a separating buffer between a primary circuit 9 and a secondary circuit 10, whereas the secondary circuit forms the actual receiver circuit. In particular, tank 5 forms the primary circuit 9 via a primary flow line 7 and a primary return pipe 8, with the secondary winding of said heat exchanger 2 on the other hand tanks, the receiver flow line 11 and said receiver pipe 12 form secondary circuit 10 of heating-water circuit 1, in which a circulating pump 16 is disposed in said primary circuit 9 and a plurality of thermometer probes 13 are disposed at different levels on tank 5, which control via a control stage 14 a flow-control valve 15 in said long-distance-heating-water circuit 3,4. Said control stage 14 forming thereby the aforementioned first control circuit for regulating the temperature in said receiver circuit 1.

The aforesaid circulating pump 16 is disposed in the primary flow line 7 of the primary circuit 9 of heating-water circuit 1, the speed thereof is controlled by a further temperature-differential-controlled automatic control system 17 that is in operative connection with further thermometer probes 18, 19 on the flow line 3 of said long-distance-heating-water circuit 3,4 and on said primary flow line 7 of said heating-water circuit 1. Thus, said control system 17 forms the second control circuit for controlling the passage in said receiver circuit 1, said circulating pump 16 controlled in such a manner, provides thereby accordingly the detected difference in temperature between advancing long-distance heating water and advancing heating water for a continuously regulated, an optimal heat take-over effectuating heating-water flow velocity, whereat a regeneration takes place by the probe control of said flow-control valve 15 in said long-distance-heating-water circuit, here in said return pipe 4.

For a system starting without an effect on the receiver side, a return pipe 20 is parallel to cylindrical tank 5 in said primary circuit 1, which discharges via a reversing valve 21 into primary return pipe 8 of primary circuit 9 of heating-water circuit 1. Hereby, reversing valve 21 is operable by a further temperature-differential automatic control system 24 which is operatively connected with further thermometer probes 22, 23 on primary flow line 7 of primary circuit 9 of heating-water circuit 1 and on the forward-flowside level of said cylindrical tank 5 respectively, in order to change over to operating condition when a specified first-running temperature is attained.

As mentioned above, the position of flow-control valve 15 affects the function of said receiver-side circulating pump 16 via a regenerative signal ensuing via thermometer probe 18 in the long-distance-heating-water flow line 3 to respective control system 17.

Figure 2:
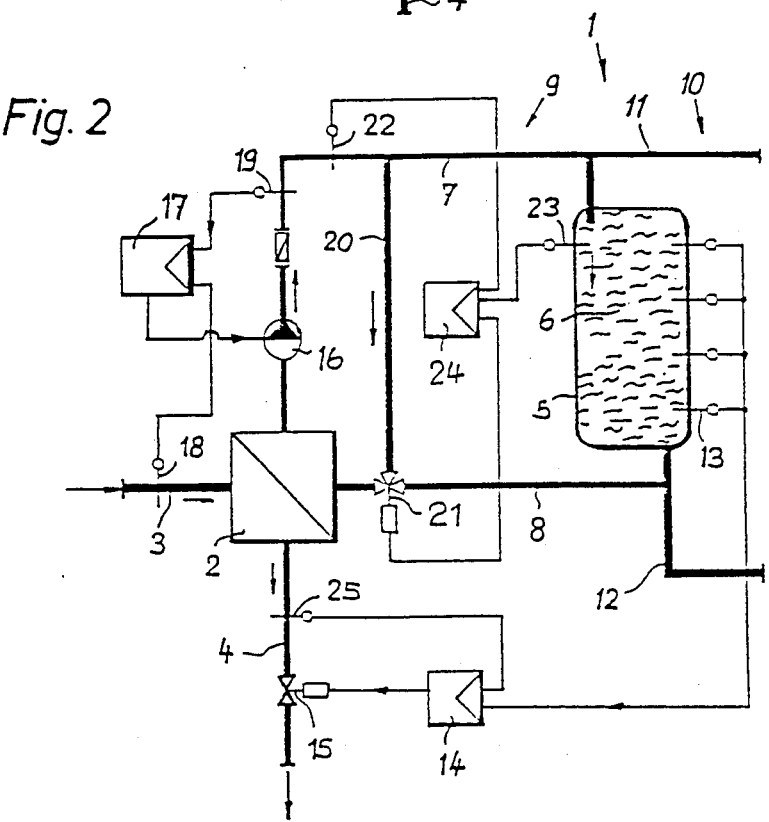
FIG. 2 is a further variant of the embodiment according to FIG. 1.

In the specified example of application according to FIG. 2, four positions on said flow-control valve 15 are controllable via said thermometer probes 13 on said tank 5. Here, of the said level-different thermometer probes 13 on said tank 5, the probe at the lowest level brings about, at a specified highest temperature, a closing of said flow-control valve 15 in said long-distance-heating-water circuit 3, 4 and, at a specified lowest temperature of said heating-water column 6, the probe at the highest level brings about a complete opening of said flow-control valve 15, whereas thermometer probes lying at an intermediate level bring about, at specified intermediate-level temperatures, variant partial openings, for example 20% and 60%; of said flow-control valve 15.

While there are shown and described preferred embodiments of the invention, it is to be distinctly understood that the invention is not limited thereto but may be embodied and practised within the scope of the following claims. Accordingly,

What I claim is:

1. A receiving station for long distance heating of a heated medium, comprising:
    a receiver circuit containing a circulating heated medium and including a variable circulating pump;
    a bypass line in said receiver circuit including means for controlling a flow of said heated medium in said receiver circuit;
    a long distance heating circuit including a flow-control valve and carrying a heating medium;
    heat-exchanging means for indirectly heating said heated medium in said receiver circuit by said heating medium in said long distance heating circuit, said heat-exchanging means being operatively connected with said long-distance and said receiver circuits; and
    a first and a second controlling means operatively connected with said long-distance and the receiver circuits for maintaining a range of temperature and passage of the heated medium, one of said first and second controlling means being connected with said flow-control valve so that said one of said first and second controlling means regulates passage of said heating medium along said long-distance circuit in response to a change of temperature of said heated medium in said receiver circuit and the other of said first and second controlling means controls the passage of said heated medium in said receiver circuit.

2. The receiving station defined in claim 1 wherein said receiver circuit comprising:
    flow and return lines connected with said heat exchanging means.

3. The receiver station defined in claim 2, further comprising:
    means for enclosing a dynamic column of said heated medium parallel to said bypass line, said means being provided with a plurality of thermometers operatively connected with said controlling means in said receiver circuit, so that said flow-control valve operatively connected with said controlling means in said receiver circuit regulates the passage of said heating medium in said long distance circuit in response to a temperature of said heated medium measured by each of said thermometers in said means for enclosing the dynamic column of said heated medium;
    a reversing valve in said return line; and
    an automatic temperature-controlled system operatively connected with said flow line and said means for enclosing the dynamic column of the heated medium, said automatic temperature-controlled system operating said reversing valve in response to a high level of said heated medium in said means for enclosing the dynamic column of the heated medium.

4. The receiving station defined in claim 1 wherein said first and second controlling means are differential-controlled automatic control systems.

5. A heating system comprising:
    a main circulation for a heating medium delivering heat to at least one locale and including at said locale a heat exchanger and a flow control valve for controlling flow in said main circulation and through said heat exchanger;
    a receiving circulation at said locale comprising a variable displacement pump for passing a receiving medium through said heat exchanger for indirect heat exchange in said heat exchanger with the heating medium in said main circulation, said receiving circulation having means for abstracting heat from said receiving medium passing through the receiving circulation;
    a first control circuit responsive to temperature of said receiving medium and connected to said valve for controlling the flow in said main circulation and through said heat exchanger in response thereto; and
    a differential controlled second control circuit responsive to a temperature at said locale and connected to said pump for controlling displacement of said receiving medium thereby.

* * * * *